US012199354B2

(12) United States Patent
Chang et al.

(10) Patent No.: US 12,199,354 B2
(45) Date of Patent: Jan. 14, 2025

(54) ANTENNA STRUCTURE AND WIRELESS COMMUNICATION DEVICE USING THE SAME

(71) Applicant: Chiun Mai Communication Systems, Inc., New Taipei (TW)

(72) Inventors: Yun-Jian Chang, New Taipei (TW); Cho-Kang Hsu, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 323 days.

(21) Appl. No.: 17/888,827

(22) Filed: Aug. 16, 2022

(65) Prior Publication Data

US 2023/0066095 A1 Mar. 2, 2023

(30) Foreign Application Priority Data

Aug. 17, 2021 (CN) ......................... 202110945067.2

(51) Int. Cl.

*H01Q 5/364* (2015.01)
*H01Q 1/38* (2006.01)
*H01Q 1/52* (2006.01)
*H01Q 5/357* (2015.01)

(52) U.S. Cl.

CPC ............... *H01Q 5/357* (2015.01); *H01Q 1/38* (2013.01); *H01Q 1/52* (2013.01)

(58) Field of Classification Search

CPC ............ H01Q 5/357; H01Q 1/38; H01Q 1/52;f H01Q 5/364; H01Q 1/526

See application file for complete search history.

(56) References Cited

U.S. PATENT DOCUMENTS

| | | | | |
|---|---|---|---|---|
| 9,698,469 B2 | 7/2017 | Lin | | |
| 2014/0361929 A1* | 12/2014 | Lin | ........................ | H01Q 1/243 343/700 MS |
| 2021/0091455 A1* | 3/2021 | Liu | ........................ | H01Q 13/10 |

FOREIGN PATENT DOCUMENTS

| | | |
|---|---|---|
| CN | 102420884 B | 5/2014 |
| CN | 207559048 U | 6/2018 |
| TW | I511377 B | 12/2015 |

* cited by examiner

*Primary Examiner* — David E Lotter

(74) *Attorney, Agent, or Firm* — ScienBiziP, P.C.

(57) ABSTRACT

An antenna structure for a metal-cased wireless device which is largely impervious to interference when held in the hand includes a radiation portion, a feeding source, a first grounding portion, a second grounding portion, and a third grounding portion. The grounding portions are sequentially arranged at intervals, and all are electrically connected to the metal frame. The first end of the radiation portion is connected to the second grounding portion and the third grounding portion, the second end of the radiation portion is connected to the first grounding portion. The feeding source is electrically connected to the radiation portion and the first grounding portion and feeds current into the antenna structure. The present disclosure also provides a wireless communication device with the antenna structure.

20 Claims, 19 Drawing Sheets

ANTENNA STRUCTURE AND WIRELESS COMMUNICATION DEVICE USING THE SAME

FIELD

The subject matter herein generally relates to wireless communications, an antenna structure, and wireless communication device using the same.

BACKGROUND

With the progress of wireless communication technology, mobile phones, personal digital assistants and other electronic devices offer diversified functions, are lightweight, faster and more efficient in data transmission. There is a design trend toward more metallic and thinner wireless communication devices. The metal forms a shielding effect on the antenna and reduces the transmission characteristics of the antenna. However, providing an antenna entirely cased in metal with good transmission characteristics maintained becomes a challenge for those skilled the art.

Therefore, improvement is needed.

BRIEF DESCRIPTION OF THE DRAWINGS

Implementations of the present disclosure will now be described, by way of embodiments, with reference to the attached figures.

DETAILED DESCRIPTION

Figure 1:
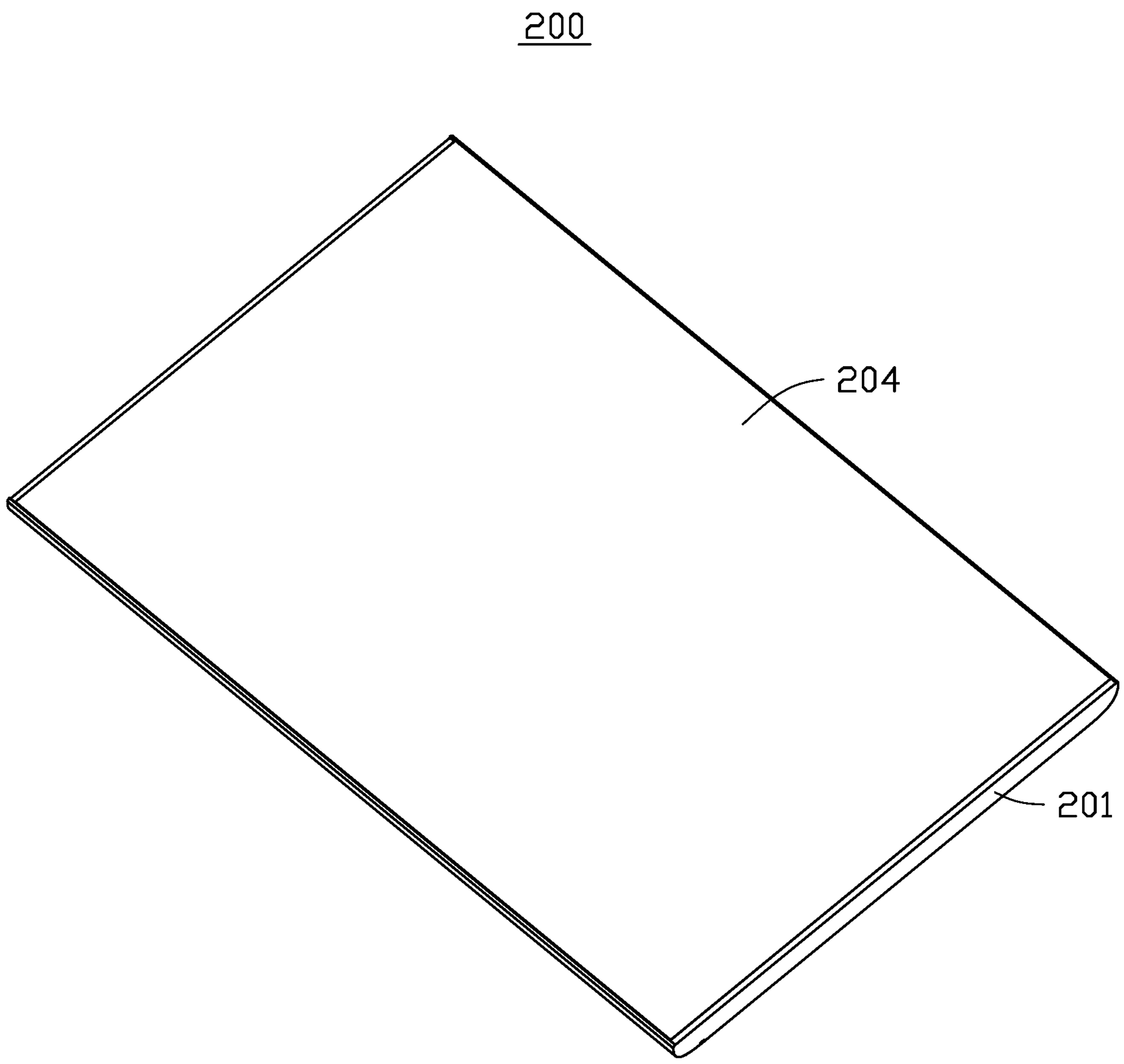
FIG. 1 is a schematic diagram of an embodiment of a wireless communication device of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
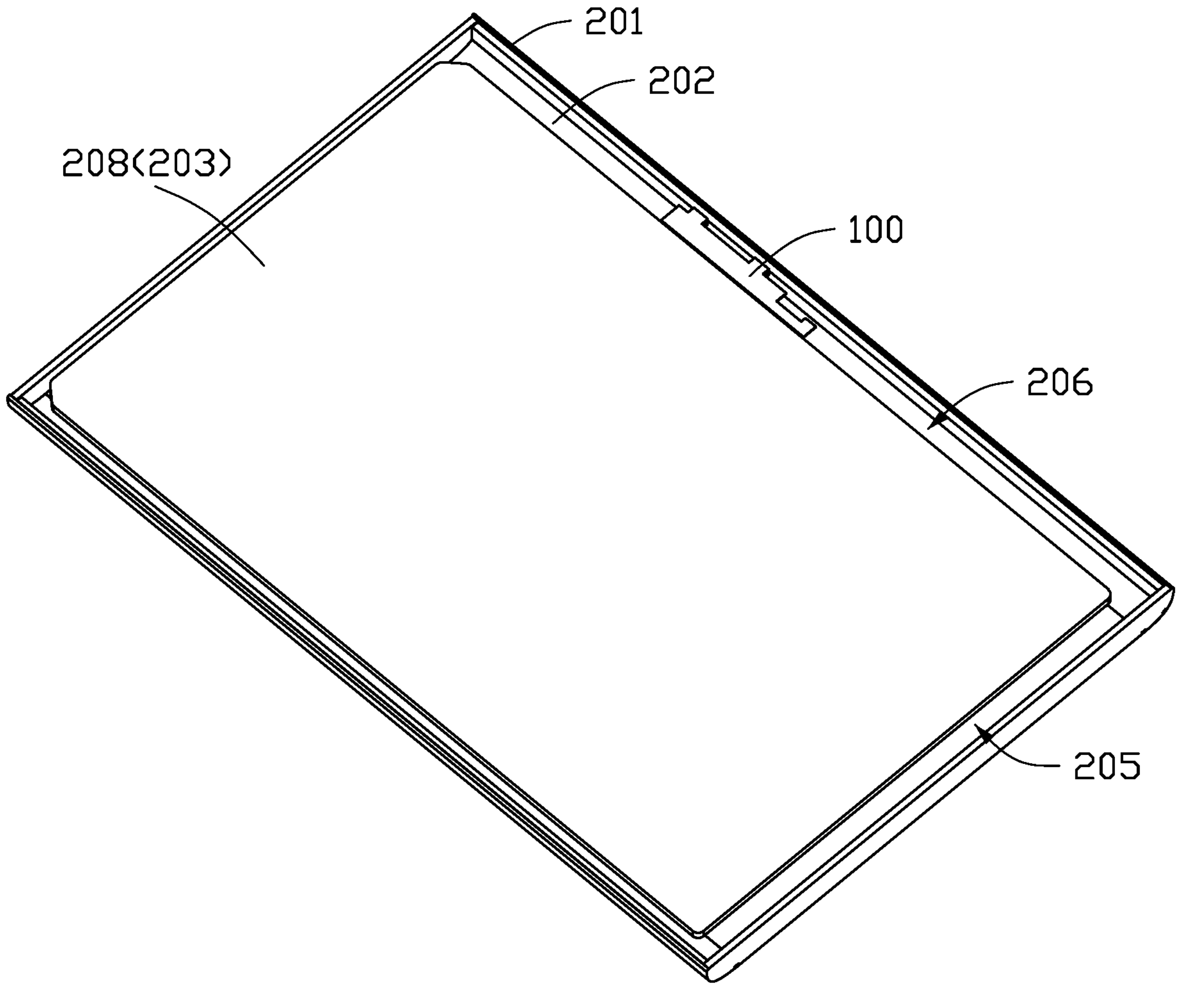
FIG. 2 shows a disassembled wireless communication device as shown in FIG. 1.

FIGS. 1 and 2 illustrate an antenna structure 100 in accordance with an embodiment of the present disclosure. The antenna structure 100 can be applied to a wireless communication device 200. The wireless communication device 200 can transmit and receive radio waves to transmit and exchange radio signals. The wireless communication device 200 can be a handheld communication device (such as a mobile phone), a foldable phone, an intelligent wearable device (such as a watch, headphones), a tablet computer, a personal digital assistant (PDA), a smart watch, a TV, or a smart car, there are no specific restrictions here.

In the embodiment, the wireless communication device 200 at least includes a metal frame 201 and a metal back cover 202. The metal frame 201 is made of metal material, and the metal frame 201 may be an outer frame of the wireless communication device 200. The metal frame 201 is disposed on the edge of the metal back cover 202. Therefore, the metal frame 201 and the metal back cover 202 constitute the casing of the wireless communication device 200, and the metal frame 201 and the metal back cover 202 together form a receiving space 205 with an opening.

The wireless communication device 200 also includes a metal element 208.

Referring to FIG. 2, the metal element 208 may be the middle frame 203. The middle frame 203 is made of metal material. The middle frame 203 is received in the receiving space 205, and the middle frame 203 and the metal back cover 202 are substantially arranged in parallel with each other and spaced apart. The middle frame 203 carries electronic components (not shown).

Figure 3:
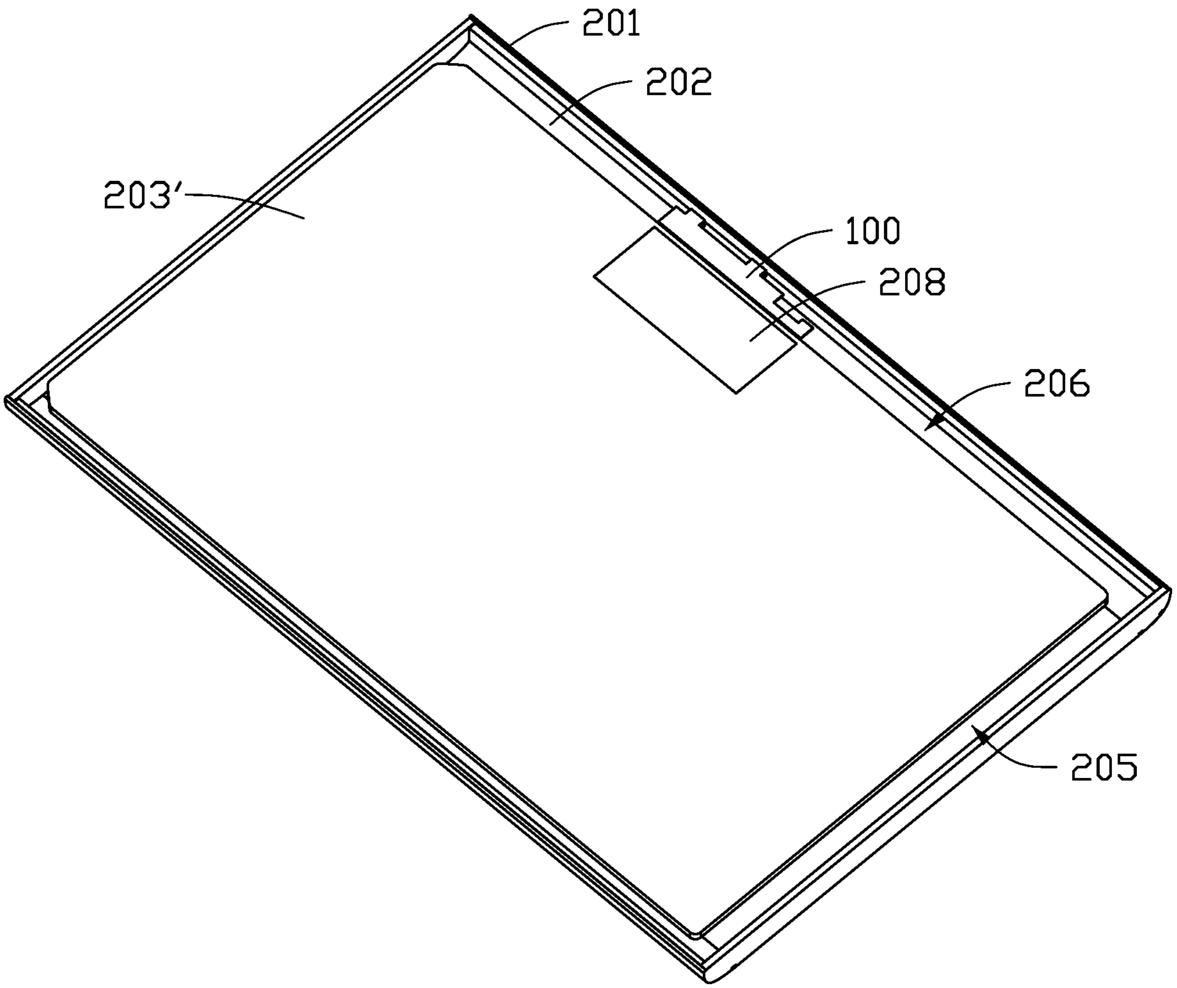
FIG. 3 is a disassembled wireless communication device of another embodiment.

Referring to FIG. 3, in some embodiments, the metal element 208 may be any one of a metal cable, a metal shielding plate, a printed circuit board, a flexible circuit board, a retaining wall, a control chip, and a camera module. The metal element 208 is disposed on the middle frame 203'.

The middle frame 203' is received in the receiving space 205, and the middle frame 203' and the metal back cover 202 are substantially parallel to each other and spaced apart. In the embodiment, the middle frame 203' can be made of metal material or plastic material.

The wireless communication device 200 also includes a display screen 204. In the embodiment, the display screen 204 may be a touch-sensitive display screen, and the display screen 204 may be used to provide an interactive interface, so as to realize interaction between the user and the wireless communication device 200. The display screen 204 is disposed in the receiving space 205, and substantially parallel to and spaced apart from the metal back cover 202.

The antenna structure 100 can be directly made of a metal sheet or made by laser direct structuring (LDS).

Figure 4:
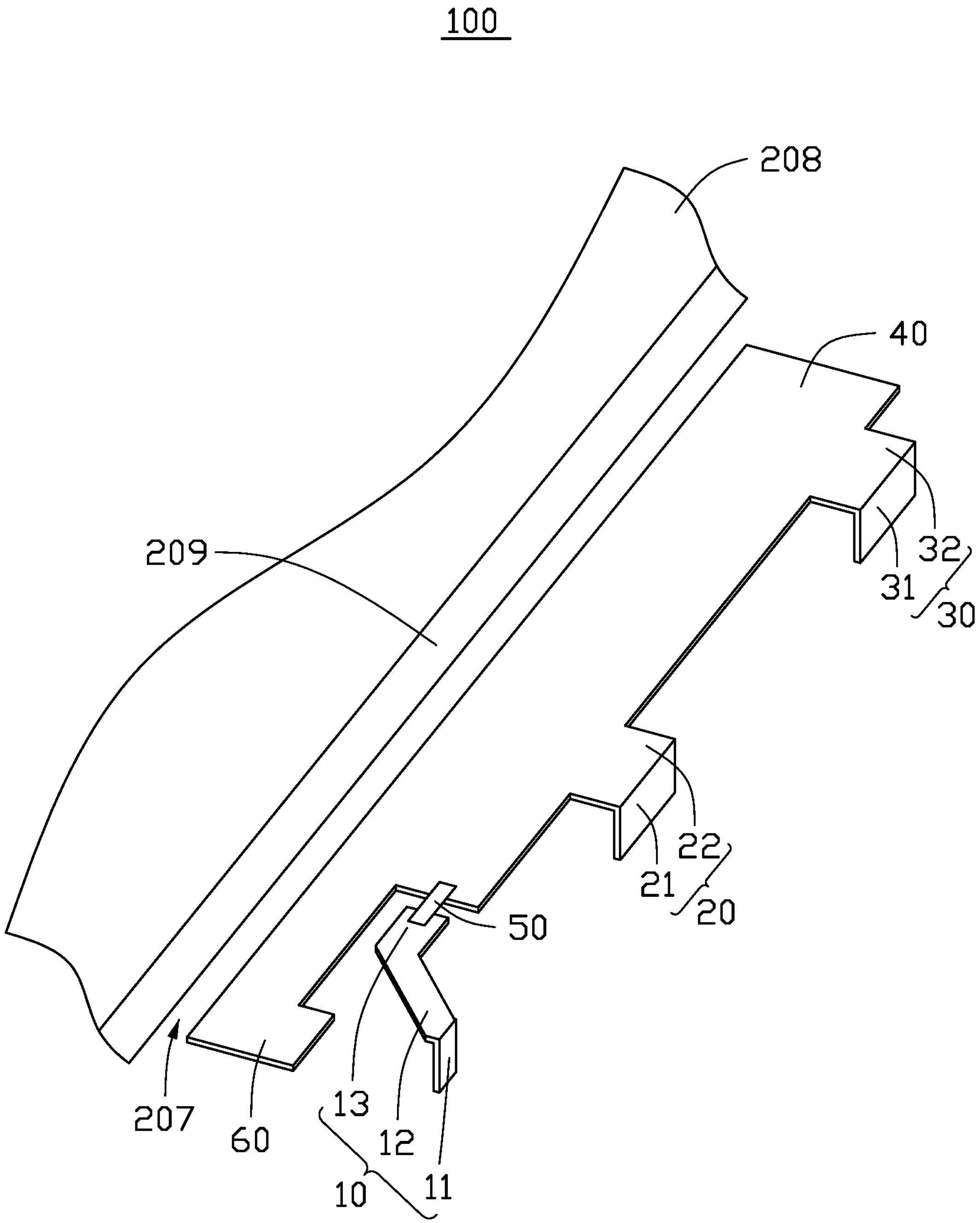
FIG. 4 is a schematic diagram of an embodiment of an antenna structure of the present disclosure.

Referring to FIG. 3 and FIG. 4, in the embodiment, the antenna structure 100 is disposed in a gap 206 between the metal element 208 and the metal frame 201, and disposed within the receiving space 205.

In the embodiment, the antenna structure 100 includes a first grounding portion 10, a second grounding portion 20, a third grounding portion 30, and a radiation portion 40. The first grounding portion 10, the second grounding portion 20 and the third grounding portion 30 are arranged at intervals in sequence and are all arranged on one side of the metal frame 201. The first grounding portion 10, the second grounding portion 20 and the third grounding portion 30 are all connected to the metal frame 201.

In the embodiment, the first grounding portion 10 includes a first bending section 11, a second bending section 12, and a third bending section 13. The first bending section 11 is substantially in the shape of a rectangular sheet. One side of the first bending section 11 is attached to the inner surface of the metal frame 201, so that the plane where the first bending section 11 is located is substantially perpendicular to the plane where the metal back cover 202 is located, and the first bending section 11 is connected to the metal frame 201. The second bending section 12 is substantially in the shape of a rectangular sheet. The plane where the second bending section 12 is located is perpendicular to the plane where the first bending section 11 is located. The second bending section 12 is connected to an end of the first bending section 11 away from the metal back cover 202, extending to the side where the second grounding portion 20 is located, and the second bending section 12 and the metal frame 201 form an acute angle. The third bending section 13 is substantially in the shape of a rectangular sheet, the third bending section 13 is connected to the end of the second bending section 12 away from the first bending section 11, and the third bending section 13 extends in a direction parallel to the metal frame 201 and close to the second grounding portion 20.

The second grounding portion 20 includes a fourth bending section 21 and a fifth bending section 22. The fourth bending section 21 is substantially in the shape of a rectangular sheet. One side of the fourth bending section 21 is attached to the inner surface of the metal frame 201, so that the plane where the fourth bending section 21 is located is substantially perpendicular to the plane where the metal back cover 202 is located, and the fourth bending section 21 is connected to the metal frame 201. The fifth bending section 22 is substantially in the shape of a rectangular sheet. The plane where the fifth bending section 22 is located is perpendicular to the plane where the fourth bending section 21 is located. The fifth bending section 22 is connected to an end of the fourth bending section 21 away from the metal back cover 202 and extends vertically along a direction away from the metal frame 201.

The third grounding portion 30 includes a sixth bending section 31 and a seventh bending section 32. The sixth bending section 31 is substantially in the shape of a rectangular sheet. One side of the sixth bending section 31 is attached to the inner surface of the metal frame 201, so that the plane where the sixth bending section 31 is located is substantially perpendicular to the plane where the metal back cover 202 is located, and the sixth bending section 31 is connected to the metal frame 201. The seventh bending section 32 is substantially in the shape of a rectangular sheet. The plane where the seventh bending section 32 is located is perpendicular to the plane where the sixth bending section 31 is located. The seventh bending section 32 is connected to an end of the sixth bending section 31 away from the metal back cover 202 and extends vertically along a direction away from the metal frame 201.

The radiation portion 40 is disposed on a side of the second grounding portion 20 and the third grounding portion 30 away from the metal frame 201. One end of the radiation portion 40 is connected to the second grounding portion 20 and the third grounding portion 30, and the other end of the radiation portion 40 is connected to the first grounding portion 10. In one embodiment, the radiation portion 40 can be connected to the fifth bending section 22 of the second grounding portion 20 and the seventh bending section 32 of the third grounding portion 30.

In the embodiment, the second bending section 12, the third bending section 13, the fifth bending section 22, and the seventh bending section 32 are coplanar with the radiation portion 40. The plane where the first bending section 11, the fourth bending section 21, and sixth bending section 31 are located is perpendicular to the plane where the radiation portion 40 is located. The plane where the radiation portion 40 is located, and the plane where the metal back cover 202 is located, are parallel to each other.

The antenna structure 100 further includes a feeding source 50. The feeding source 50 is electrically connected to the radiation portion 40, for feeding current as signals into the radiation portion 40. The first grounding portion 10 is also electrically connected to the feeding source 50 to provide grounding for the feeding source 50. The radiation portion 40 and the first grounding portion 10 are connected through the feeding source 50.

In the embodiment, the antenna structure 100 further includes an extension portion 60. The extension portion 60 is approximately in the shape of an inverted L. One end of the extension portion 60 is connected to the radiation portion 40, and other end of the extension portion 60 extends for a distance in a direction away from the radiation portion 40, and is vertically bent in a direction toward the first grounding portion 10. The extension portion 60 extends for a distance toward the first grounding portion 10 and is spaced from the first grounding portion 10.

One side of the extension portion 60 away from the first grounding portion 10 and one side of the radiation portion 40 away from the second grounding portion 20 and the third grounding portion 30 are flush with each other.

In the embodiment, the extension portion 60 and the radiation portion 40 are coplanar. The plane where the radiation portion 40 and the extension portion 60 are located is arranged to be parallel to the plane where the metal back cover 202 is located. Since the metal back cover 202 shields against radiation, the radiation portion 40 and the extension portion 60 radiate most of the energy in the direction toward the display screen 204, which meets the requirements of the antenna operation.

In one embodiment, the antenna structure 100 can achieve energy radiation without setting any breakpoint, gap or slot on the metal frame 201. In other words, the metal frame 201 can be a complete and continuous metal frame.

In other embodiments, the metal frame 201 may also define a gap, a slot or a breakpoint to serve as a frame antenna of the wireless communication device 200, thereby working with the antenna structure 100 to achieve energy radiation.

In one embodiment, the second grounding portion 20, the third grounding portion 30, the radiation portion 40, and the extension portion 60 are integrally formed.

In one embodiment, a support member (not shown) may be provided below the radiation portion 40, the extension portion 60, the first grounding portion 10, the second grounding portion 20, and the third grounding portion 30, to strengthen and stabilize the antenna structure 100.

Referring to FIG. 3 and FIG. 4, in one embodiment, the metal element 208 is disposed approximately corresponding to the middle of the metal frame 201. The metal element 208 includes at least one metal layer 209. The metal layer 209 is formed in the wireless communication device 200 and is spaced apart from the metal frame 201 to form the gap 206.

The antenna structure 100 is disposed in the gap 206. The radiation portion 40 is disposed close to the metal layer 209 and forms a further slit 207 with the metal layer 209.

The current fed from the feeding source 50 flows through the radiation portion 40 and couples to the metal layer 209 through the slit 207, thereby enabling the antenna structure 100 to generate additional frequency bands (see below-mentioned description). In the embodiment, the metal layer 209 and the metal frame 201 are parallel to each other.

Figure 5:
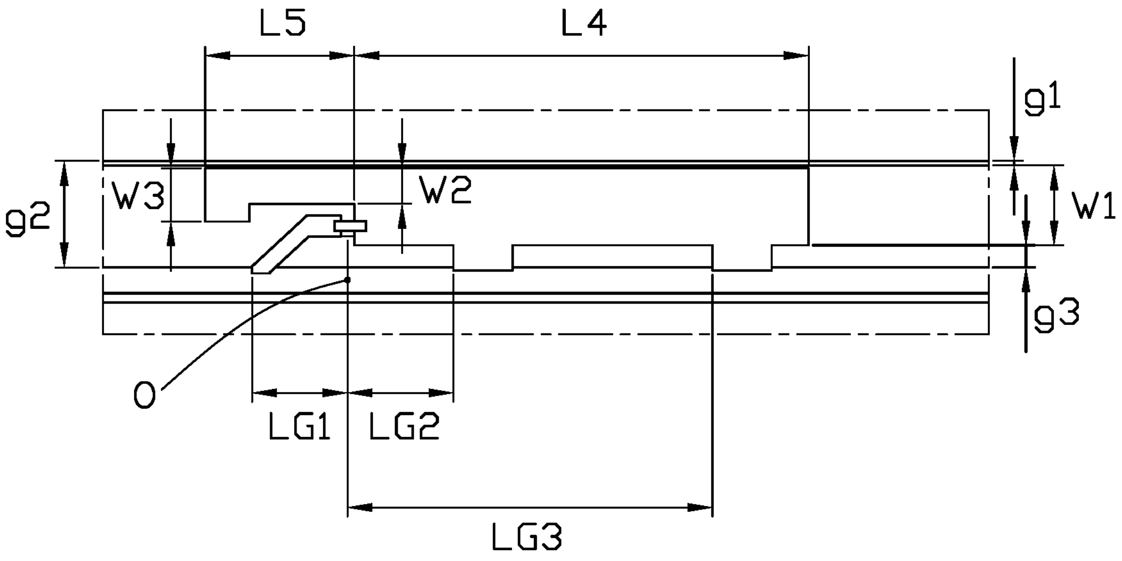
FIG. 5 is a schematic diagram of a size of the antenna structure shown in FIG. 4.

FIG. 5 is a schematic diagram of the size of the antenna structure 100. In the embodiment, the width g1 of the slit 207 is 0.5 mm. The width g2 of the gap 206 is 6.7 mm. The length L4 of the radiation portion 40 is 30.7 mm. The width W1 of the radiation portion 40 is 5.2 mm. The distance g3 between the radiation portion 40 and the metal frame 201 is 1.5 mm. The length L5 of the extension portion 60 is 10 mm. The width W2 of the end of the extension portion 60 close to the radiation portion 40 is 2.4 mm, and the width W3 of the other end of the extension portion 60 away from the radiation portion 40 is 3.6 mm. Taking a vertically projection of the feeding source 50 onto the metal frame 201 as the center point O, along the extending direction of the metal frame 201, the distance LG1 from the center point O to the first grounding portion 10 is 5.7 mm. The distance LG2 from the center point O to the second grounding portion 20 is 6.7 mm, and the distance LG3 from the center point O to the third grounding portion 30 is 24.2 mm. In one embodiment, the size of the antenna structure 300 may be adjusted by request.

Figure 6:
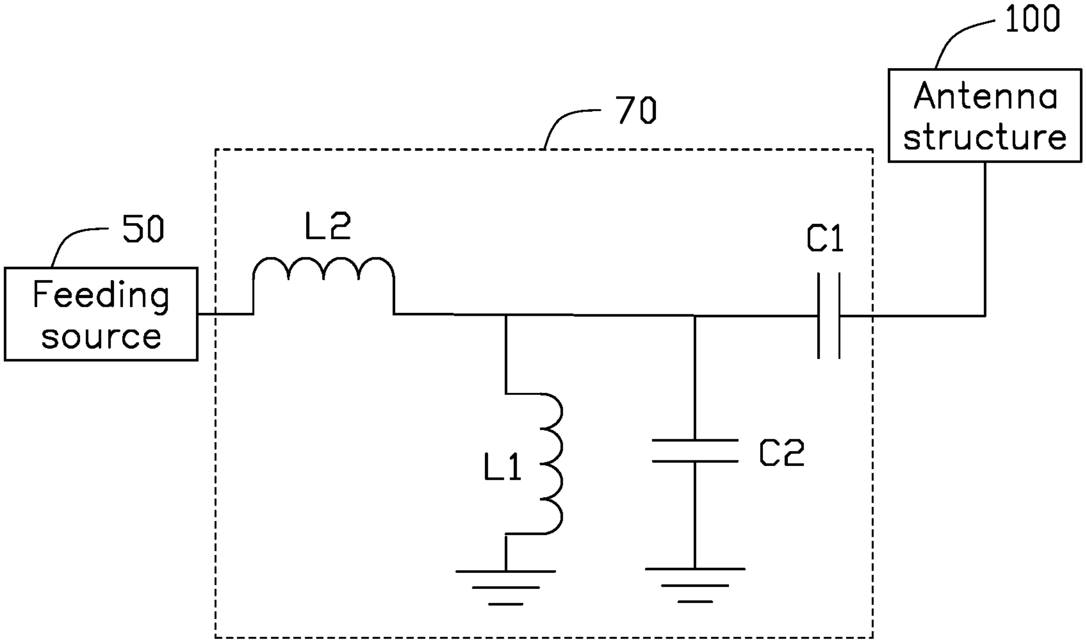
FIG. 6 is a circuit diagram of an embodiment of a matching circuit of a wireless communication device of the present disclosure.

Referring to FIG. 6, in one alternative embodiment, the feeding source 50 is connected to the antenna structure 100 through a matching circuit 70. The matching circuit 70 includes a first capacitor C1, a second capacitor C2, a first inductor L1, and a second inductor L2. The first end of the first capacitor C1 is connected to the antenna structure 100, for example, the first end of the first capacitor C1 is connected to the radiation portion 40 of the antenna structure 100, the second end of the first capacitor C1 is connected to the first end of the second capacitor C2, and the second end of the second capacitor C2 is grounded. The first end of the first inductor L1 is connected between the first capacitor C1 and the second capacitor C2, and the second end is grounded. The first end of the second inductor L2 is connected between the first capacitor C1 and the first inductor L1, and the second end of the second inductor L2 is connected to the feeding source 50. The feeding source 50 feeds electrical signals to the antenna structure 100 through the matching circuit 70.

In the embodiment, the capacitance values of the first capacitor C1 and the second capacitor C2 are both 0.3 picofarads (pf). The inductance value of the first inductor L1 is 3 nanohenries (nh), and the inductance value of the second inductor L2 is 2 nanohenries (nh).

Figure 7:
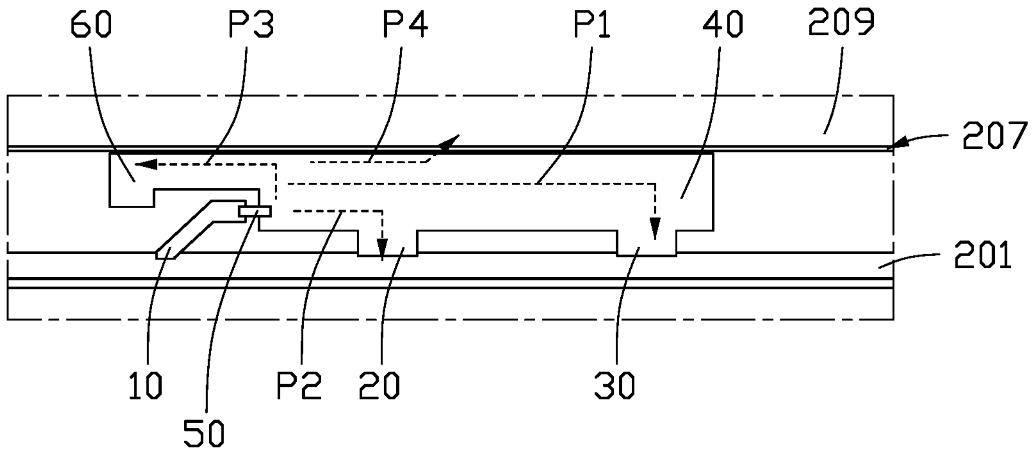
FIG. 7 is a schematic diagram of direction of current of the antenna structure shown in FIG. 4.

FIG. 7 is a schematic diagram of the current flow paths when the antenna structure 100 is working. After the current is fed from the feeding source 50, the current will flow through the radiation portion 40 and be grounded through the third grounding portion 30 (shown in path P1), thereby exciting a first working mode and a second working mode to generate radiation signals of a first frequency band and a second frequency band. The frequency of the first frequency band is lower than the frequency of the second frequency band, and the frequency of the second frequency band is a multiplication of the first frequency band.

After the current is fed from the feeding source 50, the current will flow through the radiation portion 40 and be grounded through the second grounding portion 20 (shown in path P2), thereby exciting a third working mode to generate radiation signals in a third frequency band.

After the current is fed from the feeding source 50, the current will flow through the radiation portion 40 and flow to the extension portion 60 (shown in path P3), thereby exciting a fourth working mode to generate radiation signals in a fourth frequency band.

After the current is fed from the feeding source 50, the current will flow through the radiation portion 40 and couples to the metal layer 209 through the slit 207 (shown in path P4), thereby exciting a fifth working mode to generate radiation signals in a fifth frequency band.

In the embodiment, the first working mode is the WIFI 2.4G mode, and the first frequency band includes 2400 MHz-2480 MHz. The second working mode is the WIFI 6E working mode, and the second frequency band includes 6500 MHz-7105 MHz. The third working mode is also the WIFI 6E working mode, and the third frequency band includes 5946 MHz-6500 MHz. The fourth working mode is the WIFI 5G working mode, and the fourth frequency band includes 5170 MHz-5330 MHz. The fifth working mode is a Sub-6G working mode, and the fifth frequency band includes 3300 MHz-3600 MHz wavelengths.

Figure 8:
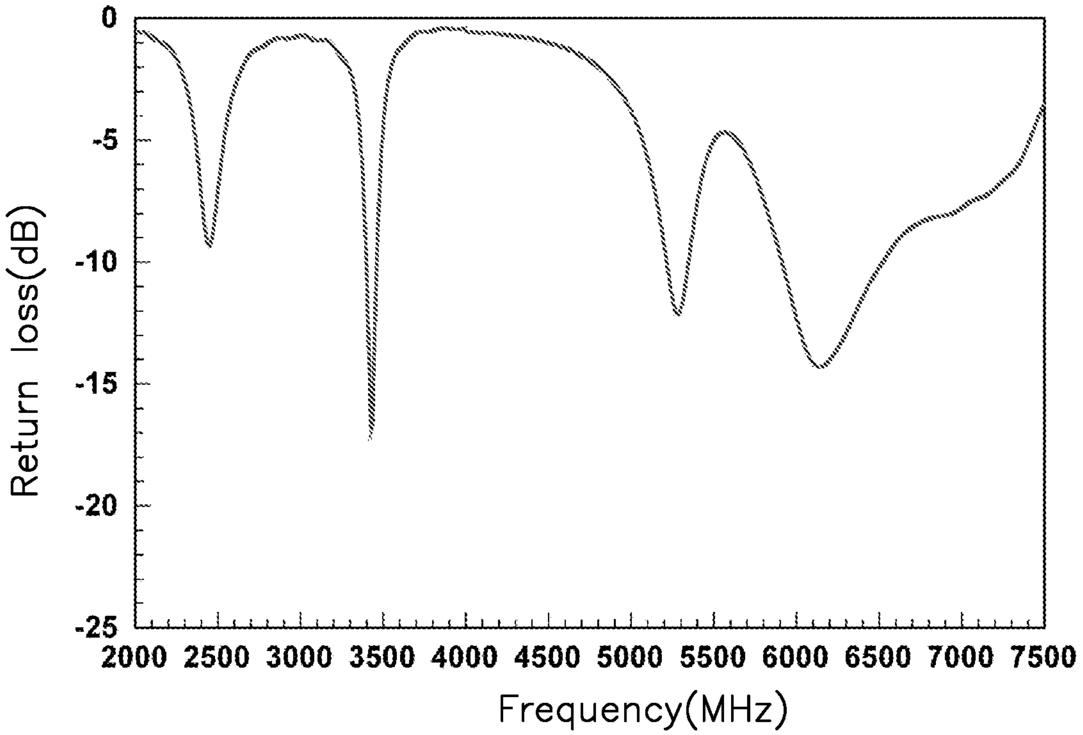
FIG. 8 is a return loss curve of the antenna structure shown in FIG. 4.

FIG. 8 is a return loss curve diagram of the antenna structure 100 during operation. As shown in FIG. 8, the antenna structure 100 works in first frequency band (2400 MHz-2480 MHz), second frequency band (6500 MHz-7105 MHz), third frequency band (5946 MHz-6500 MHz), fourth frequency band (5170 MHz-5330 MHz), and fifth frequency band (3300 MHz-3600 MHz), and covers WIFI 2.4G WIFI WIFI 6E, and Sub-6G, and has wide frequency coverage.

Figure 9:
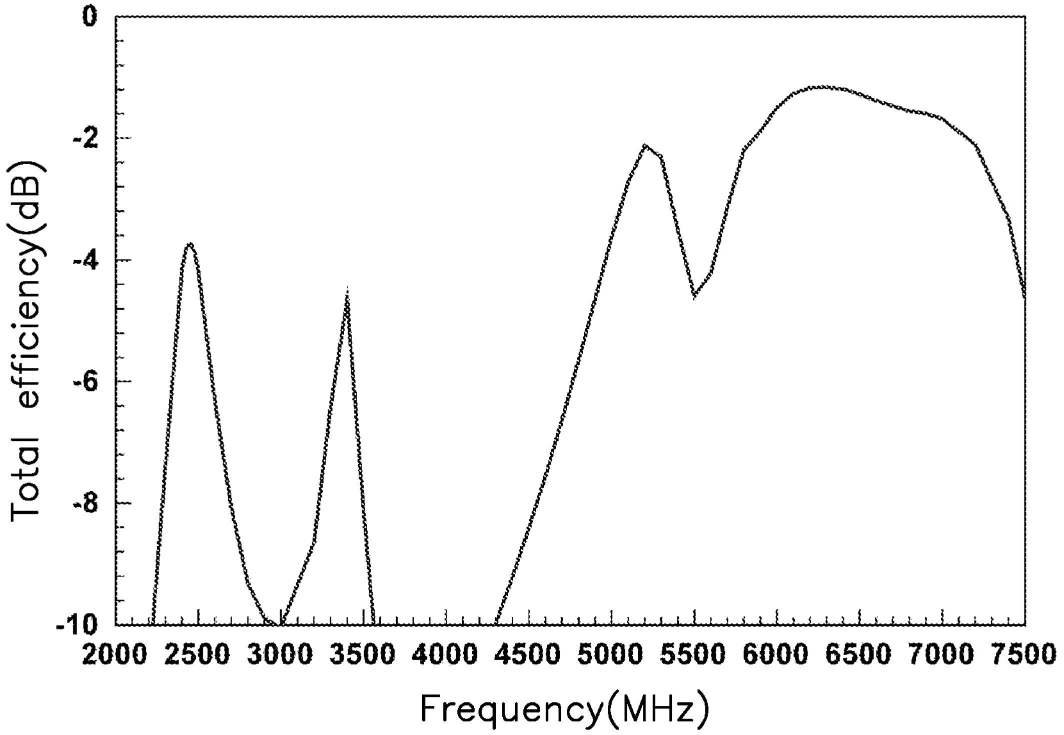
FIG. 9 is a total efficiency curve of the antenna structure shown in FIG. 4.

FIG. 9 is a diagram for illustrating total efficiency curve of the antenna structure 100 during operation. The total efficiency of the first frequency band is approximately −3.9 dB, the total efficiency of the second frequency band and the third frequency band is approximately −1.5 dB, the total efficiency of the fourth frequency band is approximately −2.2 dB, and the total efficiency of the fifth frequency band is approximately −4.2 dB. The antenna structure 100 works with an improved total efficiency.

In other embodiments, the antenna structure 100 can also be applied to 3G/4G/5G antennas, GPS antennas, and BLUETOOTH antennas.

Figure 10:
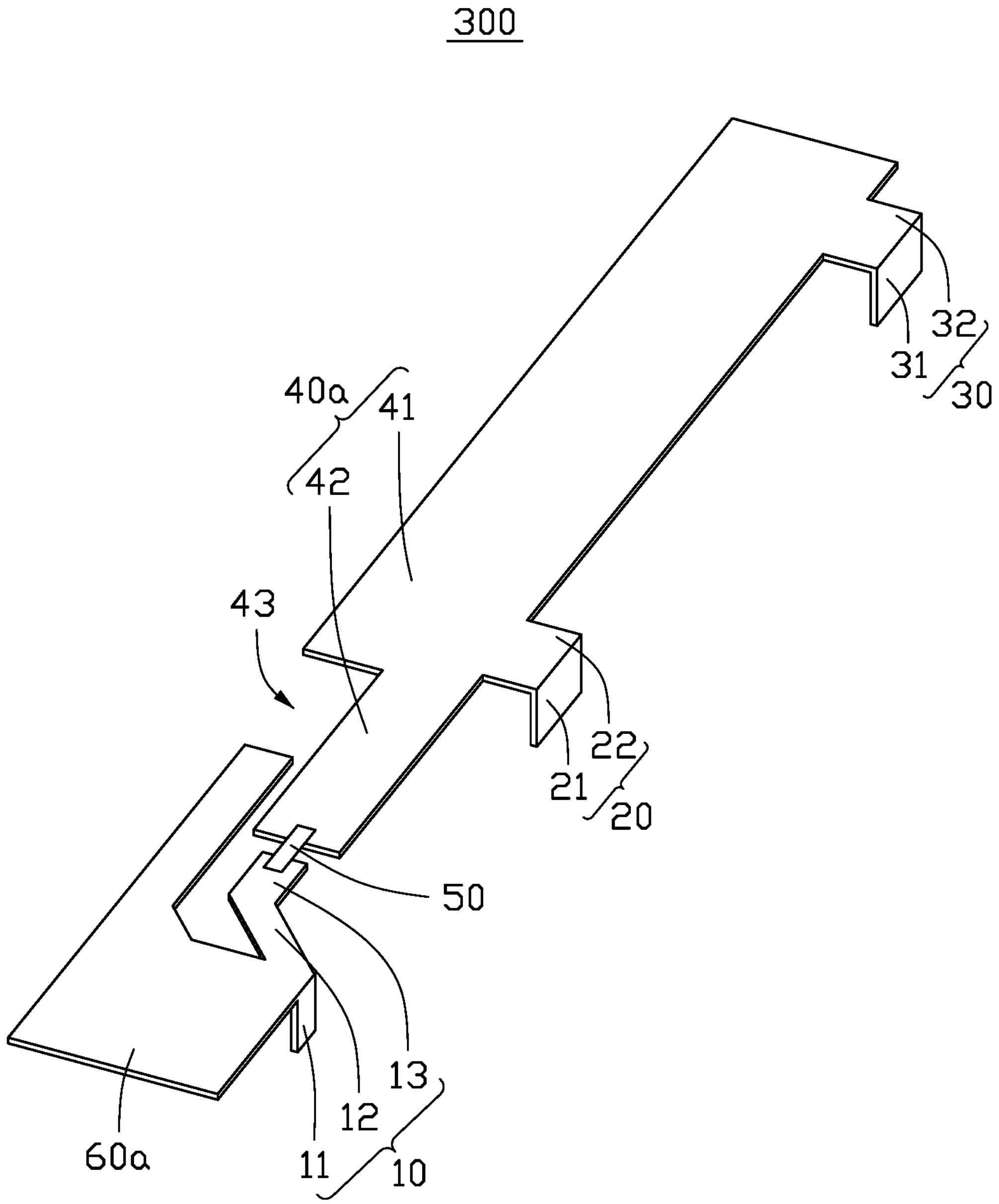
FIG. 10 is a schematic diagram of another embodiment of an antenna structure of the present disclosure.

FIG. 10 illustrates an antenna structure 300 in accordance with another embodiment of the present disclosure. The antenna structure 300 can be applied to the wireless communication device 200. The antenna structure 300 includes a first grounding portion 10, a second grounding portion 20, a third grounding portion 30, a radiation portion 40*a*, an extension portion 60*a*, and a feeding source 50.

The antenna structure 300 is substantially the same as the antenna structure 100, but the structures of the radiation portion 40*a* and the extension portion 60*a* of the antenna structure 300 are different from the structures of the radiation portion 40 and the extension portion 60 of the antenna structure 100.

In the embodiment, the radiation portion 40*a* includes a main body 41 and an extension section 42. The main body 41 is substantially a square body. The main body 41 is connected to the fifth bending section 22 and the seventh bending section 32. A first end of the extension section 42 is connected to a first end of the main body 41 close to the second grounding portion 20, and a second end of the extension section 42 extends away from the main body 41. The width of the extension section 42 is smaller than the width of the main body 41. One side of the extension section 42 close to the second grounding portion 20 is flush with one side of the main body 41 close to the second grounding portion 20. The extension section 42 and the main body 41 together form a notch 43.

In the embodiment, the extension portion 60*a* is also substantially in the shape of an inverted L. One end of the extension portion 60*a* is connected to the second bending section 12 of the first grounding portion 10, other end of the extension portion 60*a* extends for a distance in a direction away from the metal frame 201, and then bends at a right angle and extends for a distance in a direction close to the radiation portion 40*a*, to extend into the notch 43. The extension portion 60*a* is spaced apart from the main body 41 and the extension section 42 of the radiation portion 40*a*.

In the embodiment, the extension portion 60*a*, the extension section 42, the main body 41, the second bending section 12, the third bending section 13, the fifth bending section 22, and the seventh bending section 32 can be arranged to be coplanar.

Figure 11:
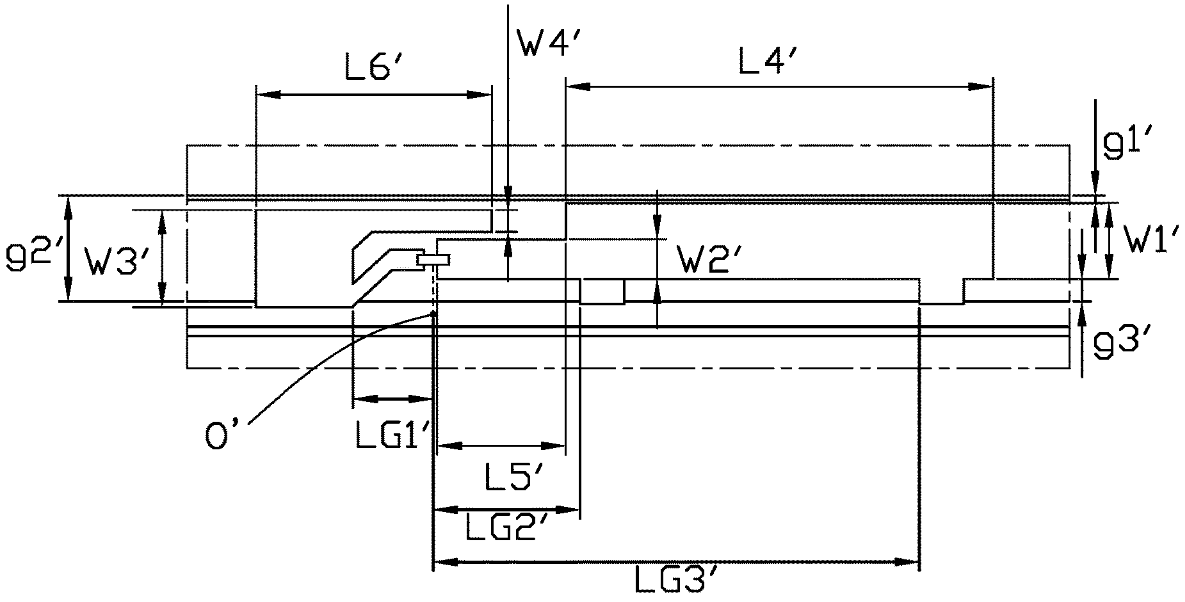
FIG. 11 is a schematic diagram of a size of the antenna structure shown in FIG. 10.

In the embodiment, the antenna structure 300 further differs from the antenna structure 100 in size. Referring to FIG. 11, in the embodiment, the width g1' of the slit 207 between the radiation portion 40*a* and the metal layer 209 is 0.5 mm, and the distance g2' between the metal layer 209 and the metal frame 201 is 6.7 mm. The distance g3' between the radiation portion 40*a* and the metal frame 201 is 1.5 mm. Taking a vertically projection of the feeding source 50 onto the metal frame 201 as the center point O', along the extending direction of the metal frame 201, the distance LG1' from the center point O' to the first grounding portion 10 is 5.7 mm, the distance LG2' from the center point O' to the second grounding portion 20 is 9.7 mm, and the distance LG3' from the center point O' to the third grounding portion 30 of the seventh bending section is 32.7 mm. The length L4' of the main body 41 is 29 mm, and the width W1' of the main body 41 is 5.2 mm. The length L5' of the extension section 42 is 8.7 mm, and the width W2' of the extension section 42 is 2.7 mm. The length L6' of the extension portion 60*a* is 16 mm, the width W3' of the end of the extension portion 60*a* away from the radiation portion 40*a* is 6.6 mm, and the width W4' of the end of the extension portion 60*a* close to the radiation portion 40*a* is 1.5 mm. In one embodiment, the size of the antenna structure 300 may be adjusted by request.

In the embodiment, the feeding source 50 is also connected to the antenna structure 300 through a matching circuit 70*a*. The antenna structure 300 further differs from the antenna structure 100 in the matching circuits. The structures of matching circuit 70*a* and matching circuit 70 are different.

Figure 12:
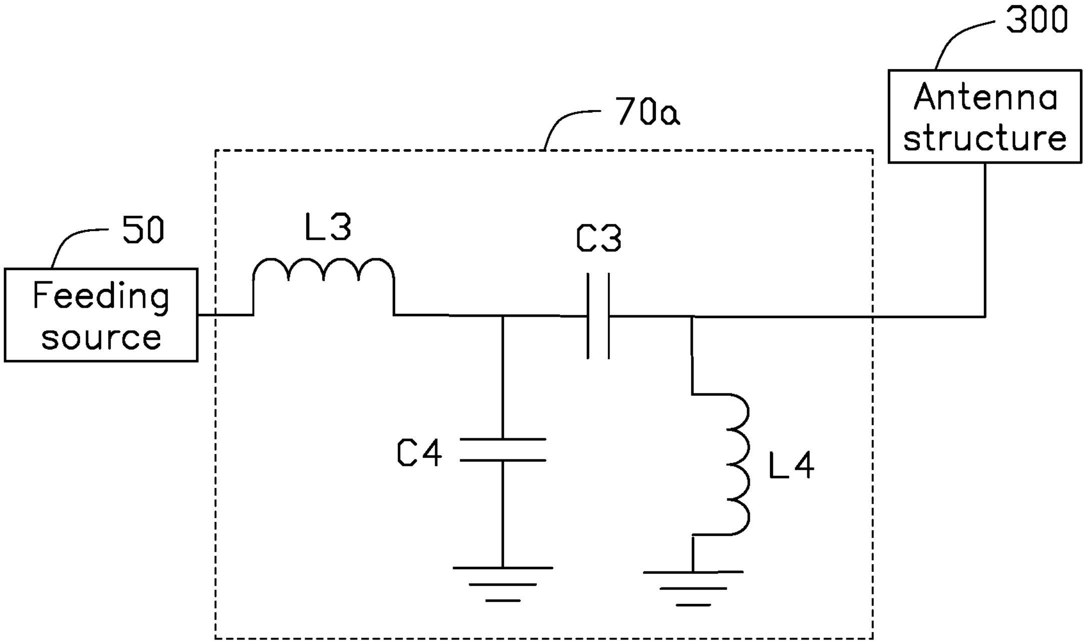
FIG. 12 is a circuit diagram of another embodiment of a matching circuit of the present disclosure.

Referring to FIG. 12, the matching circuit 70*a* includes a third capacitor C3, a fourth capacitor C4, a third inductor L3, and a fourth inductor L4. The first end of the third capacitor C3 is connected to the antenna structure 300, for example, the first end of the third capacitor C3 is connected to the radiation portion 40*a* of the antenna structure 300 and the first grounding portion 10. The second end of the third capacitor C3 is connected to the first end of the third inductor L3, and the second end of the third inductor L3 is connected to the feeding source 50. The first end of the fourth capacitor C4 is connected between the third capacitor C3 and the third inductor L3, and the second end of the fourth capacitor C4 is grounded. The first end of the fourth inductor L4 is connected between the third capacitor C3 and the antenna structure 300, and the second end of the fourth inductor L4 is grounded.

In one embodiment, the capacitance value of the third capacitor C3 is 0.5 picofarads (pf), and the capacitance value of the fourth capacitor C4 is 0.3 picofarads (pf). The inductance values of the third inductor L3 and the fourth inductor L4 are both 1.5 nanohenrys (nh).

In the embodiment, the current flow and working principle of the current path P1' in the antenna structure 300 are the same as those of the current path P1 in the antenna structure 100 and are not repeatedly described herein. The antenna structure 300 differs from the antenna structure 100 in current paths. The current flow of the current path P2', the current path P3' and the current path P4' of the antenna structure 300 are different from the current flow of the current path P2, the current path P3 and the current path P4 in the antenna structure 100.

Figure 13:
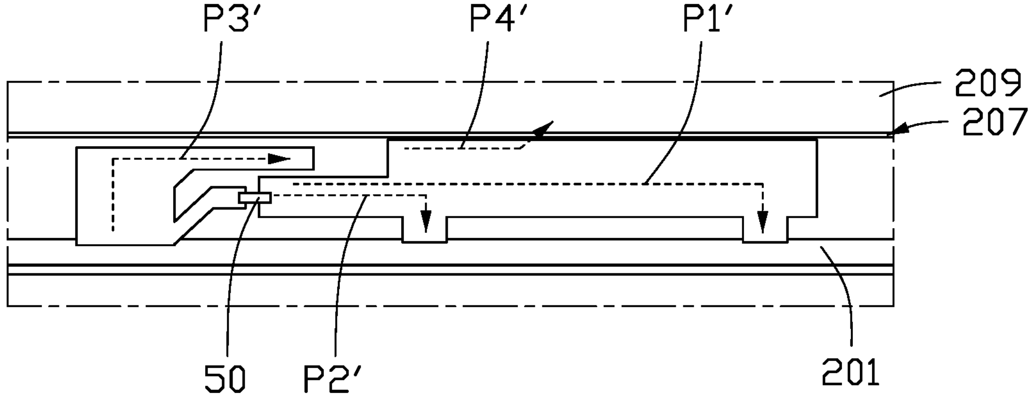
FIG. 13 is a schematic diagram of the current direction of the antenna structure shown in FIG. 10.

FIG. 13 is a schematic diagram of the current flow when the antenna structure 300 is in operation. After the current is fed from the feeding source 50, the current flows through the radiation portion 40*a*, and is grounded through the second grounding portion 20 (shown in path P2'), thereby exciting a sixth working mode to generate radiation signals in a sixth frequency band.

After the current is fed from the feeding source 50, the current will flow through the radiation portion 40*a* and couple to the extension portion 60*a* through the extension section 42 (shown in path P3'), thereby exciting a seventh working mode to generate radiation signals in a seventh frequency band.

After the current is fed from the feeding source 50, the current will flow through the radiation portion 40*a* and couple to the metal layer 209 through the slit 207 (shown in path P4'), thereby exciting an eighth working mode to generate radiation signals in an eighth frequency band.

In the embodiment, the sixth working mode and the seventh working mode are also WIFI 6E working modes, the sixth frequency band includes 5490 MHz-5570 MHz, and the seventh frequency band includes 5925 MHz-7125 MHz. The eighth working mode is a Sub-6G working mode, and the eighth frequency band includes 4400 MHz-5000 MHz.

Figure 14:
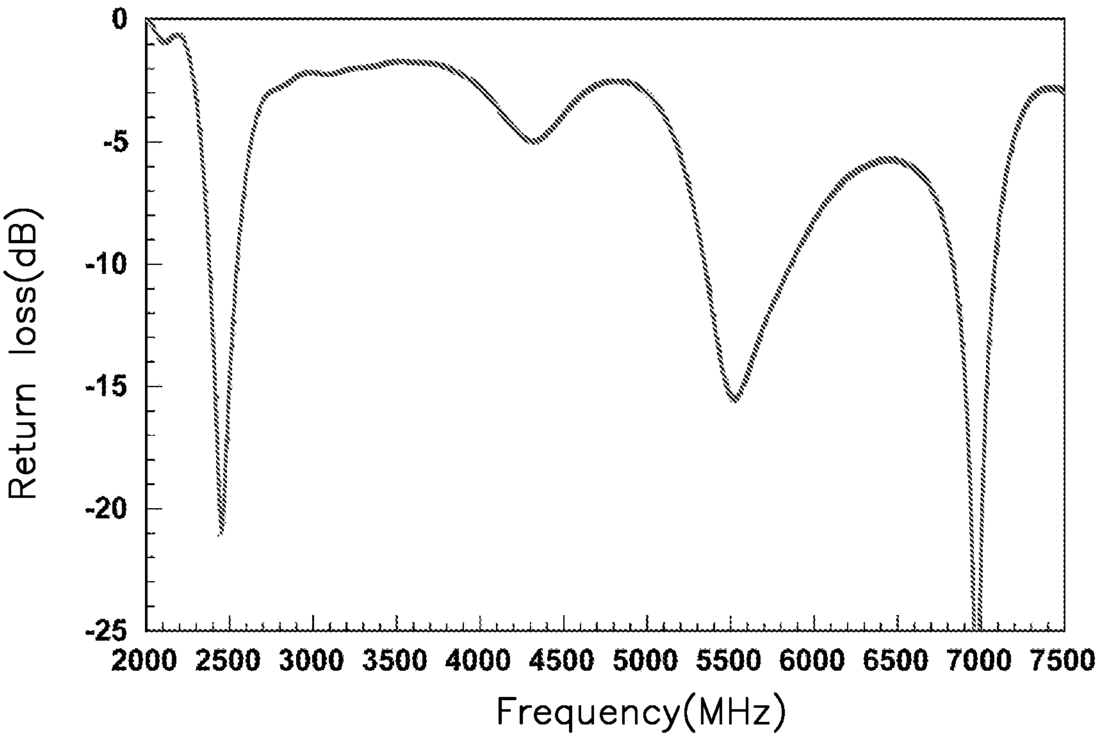
FIG. 14 is a return loss curve of the antenna structure shown in FIG. 10.

FIG. 14 is a diagram illustrating return loss of the antenna structure 300 during operation.

As shown in FIG. 14, the antenna structure 300 works in the corresponding first frequency band (2400 MHz-2480

MHz), sixth frequency band (5490 MHz-5570 MHz), seventh frequency band (5925 MHz-7125 MHz), eighth frequency band (4400 MHz-5000 MHz), and covers WIFI 2.4G, WIFI 5G, WIFI 6E, and Sub-6G, with wide frequency coverage.

Figure 15:
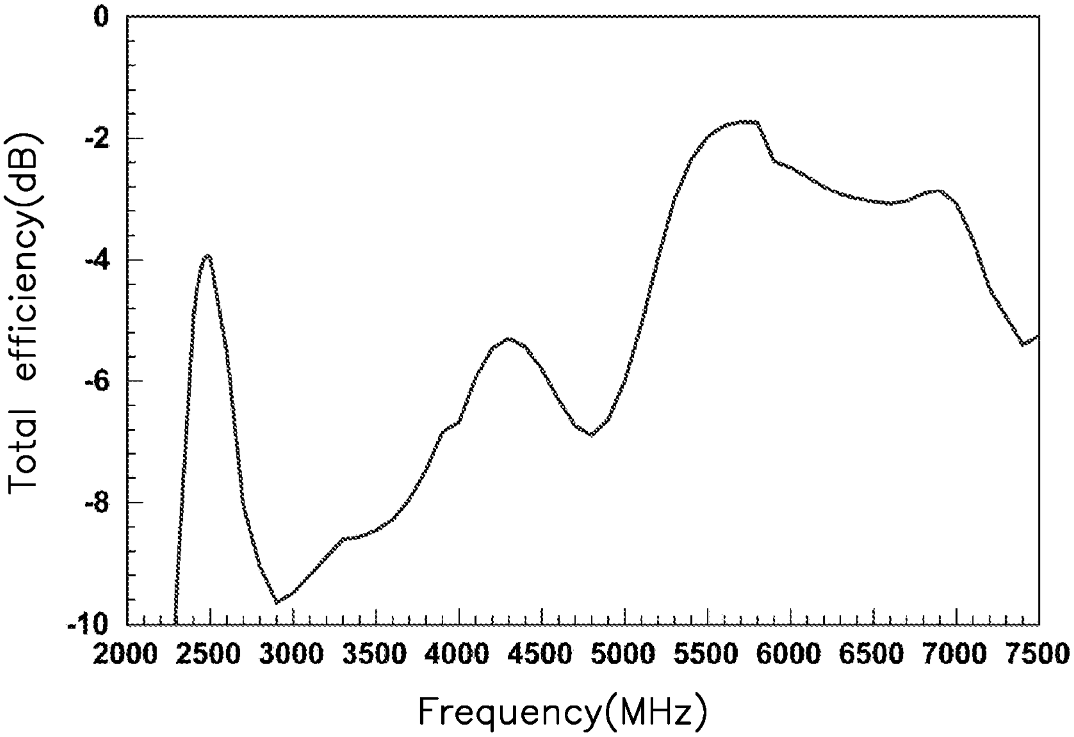
FIG. 15 is a total efficiency curve of the antenna structure shown in FIG. 10.

FIG. 15 is a diagram illustrating total efficiency of the antenna structure 300 during operation.

The total efficiency of the first frequency band is approximately −4.2 dB, the total efficiency of the seventh frequency band is approximately −2.9 dB, the total efficiency of the sixth frequency band is approximately −2.4 dB, and the total efficiency of the eighth frequency band is approximately −5.1 dB. When the antenna structure 300 is working, it does so with better total efficiency.

Figure 16:
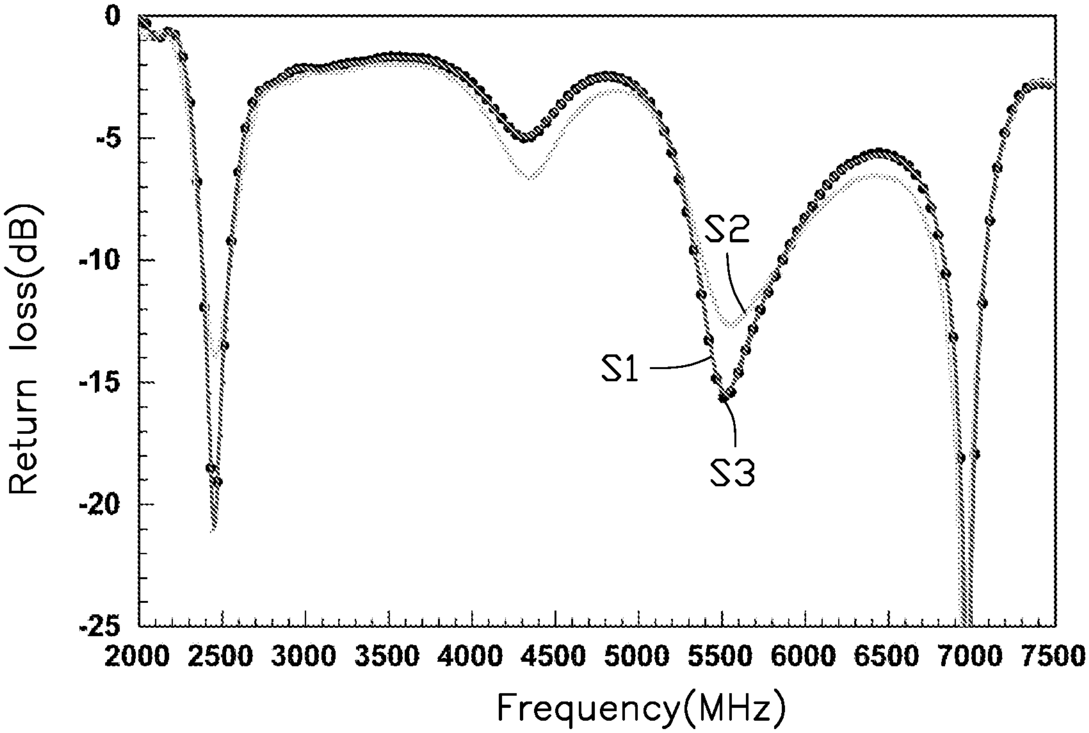
FIG. 16 is a return loss curve of the antenna structure shown in FIG. 10 in different states.

FIG. 16 is a graph of the return loss of the antenna structure 300 in different states when the antenna structure 300 is disposed in the wireless communication device 200 shown in FIG. 1.

The curve S1 is the return loss curve of the wireless communication device 200 in a free state, the state that the wireless communication device 200 does not physically contact with the human body. The curve S2 is the return loss curve when the wireless communication device 200 is held vertically with one hand and the hand touches the metal frame 201; the curve S3 is the return loss curve when the wireless communication device 200 is held horizontally with both hands, and the metal frame 201 on both sides of the wireless communication device 200 is in contact with both hands.

Figure 17:
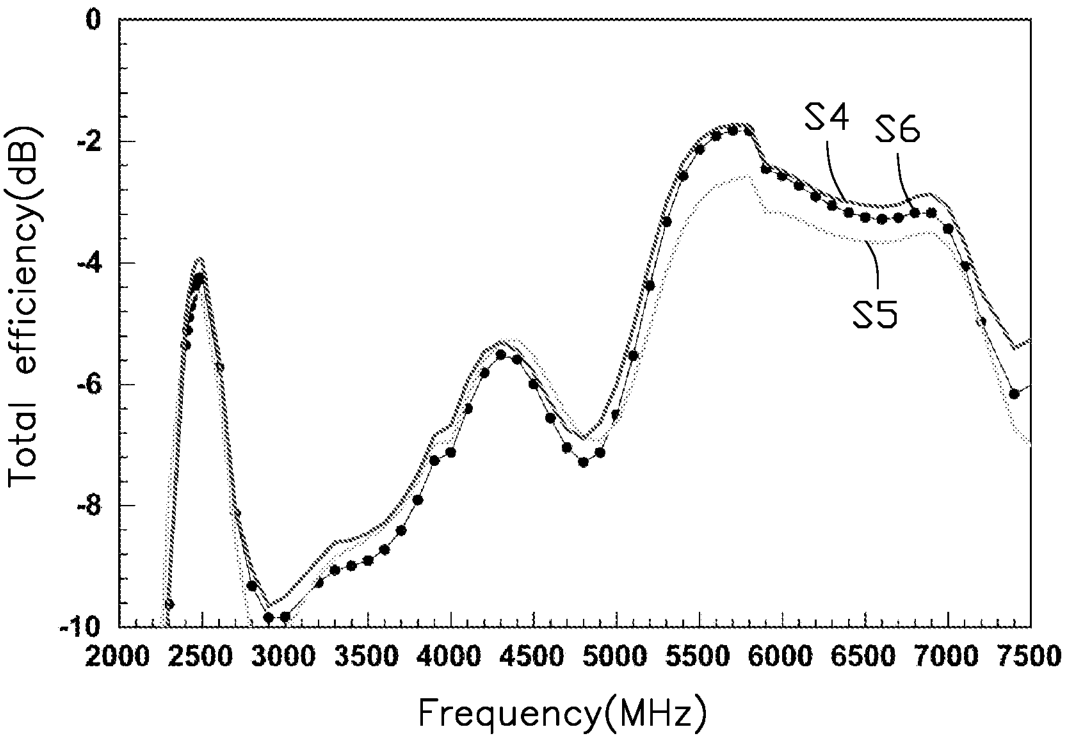
FIG. 17 is a total efficiency curve of the antenna structure shown in FIG. 10 in different states.

FIG. 17 is a graph of the total efficiency of the antenna structure 300 in different states when the antenna structure 300 is disposed in the wireless communication device 200 shown in FIG. 1.

The curve S4 is the total efficiency curve of the wireless communication device 200 in a free state; the curve S5 is the total efficiency when the wireless communication device 200 is held vertically with one hand and the hand touches the metal frame 201; the curve S6 is the total efficiency curve when the wireless communication device 200 is held laterally with both hands, and the metal frame 201 on both sides of the wireless communication device 200 is in contact with both hands.

As shown in FIG. 16 and FIG. 17, whether the wireless communication device 200 is held vertically with one hand or the wireless communication device 200 is held horizontally with both hands, the return loss of the antenna structure 300 is almost unchanged compared to the return loss of the antenna structure 300 in the free state. Compared with the total efficiency of the antenna structure 300 in the free state, the total efficiency of the antenna structure 300 is reduced by less than 1 dB. When the antenna structure 300 is disposed in the wireless communication device 200, physical contact with hands does not significantly reduce performance.

Figure 18:
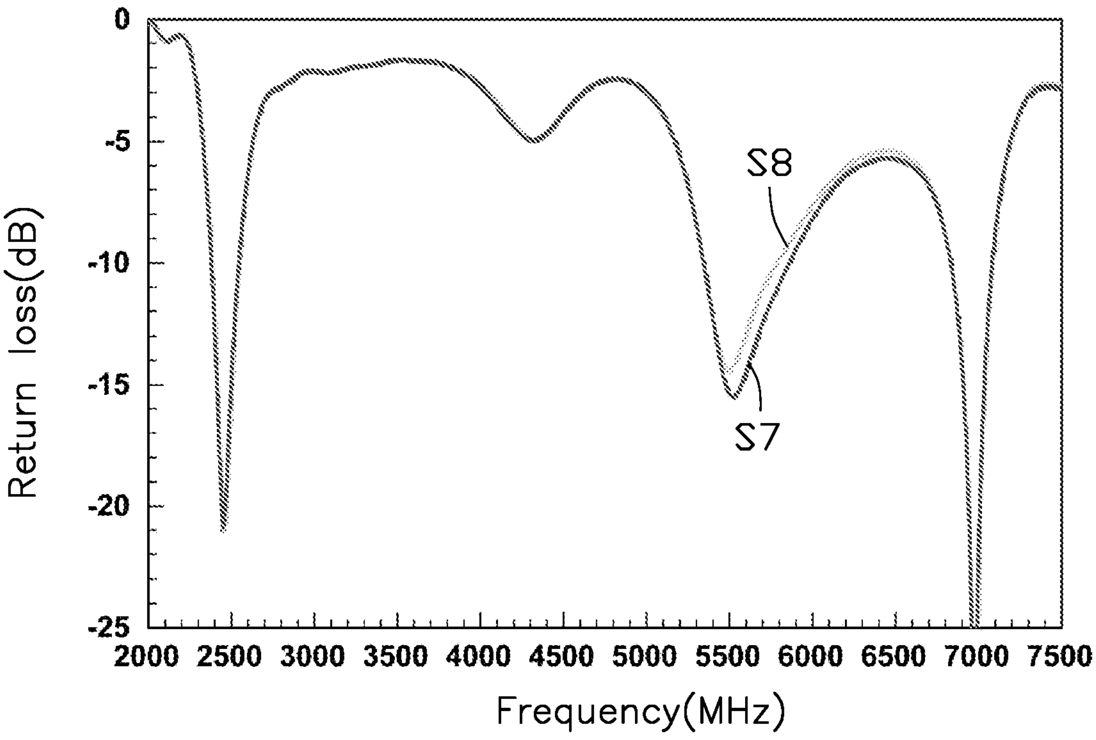
FIG. 18 is a return loss curve of the antenna structure shown in FIG. 10 in the free state and in the SAR value test environment on the 0 mm back plane.

FIG. 18 is a return loss diagram of the wireless communication device 200 in the free state and in the specific absorption ratio (SAR) test environment of the 0 mm back surface when the antenna structure 300 is disposed in the wireless communication device 200 shown in FIG. 1.

The curve S7 is the return loss curve of the wireless communication device 200 in the free state, and the curve S8 is the return loss curve of the wireless communication device 200 in the SAR value test environment of the 0 mm back surface.

Figure 19:
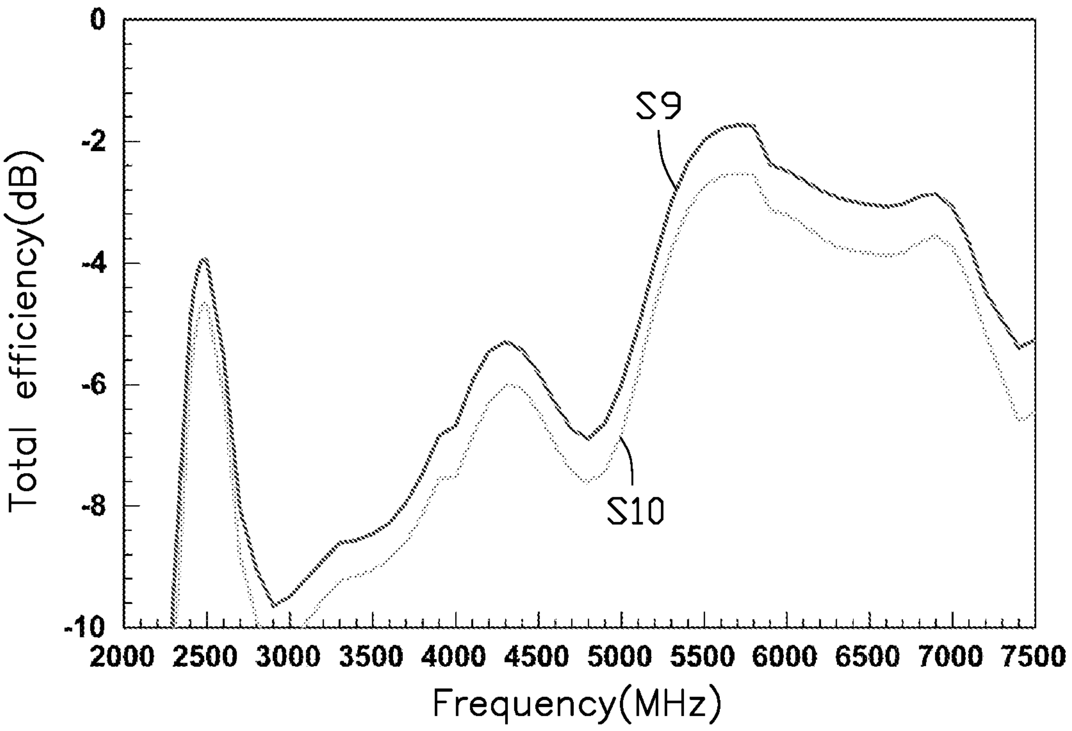
FIG. 19 is a total efficiency curve of the antenna structure shown in FIG. 10 in the free state and in the SAR value test environment on the 0 mm back plane.

FIG. 19 is a total efficiency curve diagram of the wireless communication device 200 in the free state and in an SAR value test environment of a 0 mm back surface when the antenna structure 300 is disposed in the wireless communication device 200 shown in FIG. 1.

The curve S9 is the total efficiency curve of the wireless communication device 200 in the free state, and the curve S10 is the total efficiency curve of the wireless communication device 200 in the SAR value test environment of the 0 mm back surface.

As shown in FIG. 18 and FIG. 19, compared with the return loss curve of the wireless communication device 200 in the free state, the return loss curve of the wireless communication device 200 in the SAR value test environment of the 0 mm back surface is almost unchanged; compared with the total efficiency curve of the wireless communication device 200 in the free state, the total efficiency curve of the wireless communication device 200 under the SAR value test environment of the 0 mm back surface has a smaller drop. Since the SAR value of the 0 mm back surface is tested in an environment that simulates a hand-contact environment, the antenna structure 300 disposed in the wireless communication device 200 has good non-interference characteristics.

The SAR value test table below shows that the wireless communication device 200 installed with the antenna structure 300 operates in WIFI 2.4G (such as 2.4 GHz, 2.44 GHz and 2.48 GHz), WIFI 5G (such as 5.2 GHz, 5.5 GHz, 5.8 GHz) and 5.9 GHz) and WIFI 6E (such as 6.5 GHz and 7.1 GHz) in each operating frequency band, and the signal strength is 18 dBm or 15 dBm, the measured SAR value of the metal back cover 202 is less than the safety value of 1.6, in line with requirements of wireless communication devices.

SAR value test table

| Body Back Side SAR | | 0 mm |
|---|---|---|
| Frequency (GHz) | Input Power (dBm) | 1 gAvg. SAR (mW/g) |
| 2.4 | 18 | 0.085 |
| 2.44 | 18 | 0.083 |
| 2.48 | 18 | 0.073 |
| 5.2 | 15 | 0.05 |
| 5.5 | 15 | 0.088 |
| 5.8 | 15 | 0.011 |
| 5.9 | 15 | 0.099 |
| 6.5 | 15 | 0.071 |
| 7.1 | 15 | 0.039 |

The antenna structure 100 of the present disclosure is provided with a first grounding portion 10, a second grounding portion 20, a third grounding portion 30, and a radiation portion 40. The first grounding portion 10, the second grounding portion 20, and the third grounding portion 30 are all disposed on one side of the metal frame 201 of the wireless communication device 200 and connected to the metal frame 201, the radiation portion 40 is disposed on the side of the second grounding portion 20 and the third grounding portion 30 away from the metal frame 201, the radiation portion 40 is connected to the second grounding portion 20 and the third grounding portion 30, and the radiation portion 40 and the metal back cover 202 are parallel to each other. When the antenna structure 100 (or the antenna structure 300) is disposed in the wireless communication device 200 with all-metal back cover 202, the metal frame 201 does not need to be divided, and antenna structure operates with good resistance against contact interference. Desirable aesthetic features of the wireless communication device 200 are still retained.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. An antenna structure applicable to a wireless communication device, the wireless communication device having a metal element, a metal frame and a gap, the gap being configured to be disposed between metal element and the metal frame, the antenna structure being configured to be disposed in the gap, the antenna structure comprising:

a first grounding portion;

a second grounding portion;

a third grounding portion, the first grounding portion, the second grounding portion and the third grounding portion being sequentially arranged at intervals, and the first grounding portion, the second grounding portion and the third grounding portion being electrically connected to the metal frame;

a radiation portion, the radiation portion comprising a first end and a second end, the first end connecting to the second grounding portion and the third grounding portion, and the second end connecting to the first grounding portion; and a feeding point, the feeding point electrically connecting to the radiation portion and the first grounding portion and feeding current into the antenna structure.

2. The antenna structure according to claim 1, wherein the metal element comprises at least one metal layer, the radiation portion is disposed between the at least one metal layer and the metal frame, the radiation portion is close and spaced to the metal layer.

3. The antenna structure according to claim 2, wherein the metal element is one of a middle frame, a metal cable, a metal shielding plate, a printed circuit board, a flexible circuit board, a control chip, a camera module or a retaining wall.

4. The antenna structure according to claim 1, further comprising an extension portion, the extension portion connecting to the radiation portion and the first grounding portion.

5. The antenna structure according to claim 4, wherein one end of the extension portion connects to the radiation portion, a second end of the extension portion extends for a distance in a direction away from the radiation portion and bends and extends in a direction close to the first grounding portion, and is spaced from the first grounding portion.

6. The antenna structure according to claim 4, wherein a first end of the extension portion connects to the first grounding portion, a second end of the extension portion extends for a distance in a direction away from the metal frame, and bents and extends in a direction close to the radiation portion, and is spaced from the radiation portion.

7. The antenna structure according to claim 4, wherein the extension portion and the radiation portion are disposed coplanar.

8. The antenna structure according to claim 1, wherein the radiation portion comprises a main body and an extension section, a first end of the extension section is connected to a first end of the main body close to the second grounding portion, and a second end of the extension section extends away from the main body.

9. The antenna structure according to claim 8, wherein the extension section and the main body together form a notch.

10. The antenna structure according to claim 1, further comprising a matching circuit, wherein the feeding source connects to the antenna structure through the matching circuit, the feeding source feeds electrical signals to the antenna structure through the matching circuit; wherein the matching circuit comprises a first capacitor, a second capacitor, a first inductor and a second inductor, a first end of the first capacitor connects to the radiation portion, a second end of the first capacitor connects to a first end of the second capacitor, and a second end of the second capacitor is grounded, a first end of the first inductor connects between the first capacitor and the second capacitor, and a second end is grounded, a first end of the second inductor connects between the first capacitor and the first inductor, and a second end of the second inductor connects to the feeding source.

11. A wireless communication device comprising:

a metal frame;

a metal element; and an antenna structure, disposed in a gap between the metal element and the metal frame, comprising:

a first grounding portion;

a second grounding portion;

a third grounding portion;

a radiation portion comprising a first end connected to the second grounding portion and the third grounding portion, and a second end connected to the first grounding portion; and a feeding source electrically connected to the radiation portion and the first grounding portion and configured to feed current into the antenna structure;

wherein the first grounding portion, the second grounding portion and the third grounding portion are sequentially arranged at intervals, and connected to the metal frame.

12. The wireless communication device according to claim 11, wherein the metal element comprises at least one metal layer, the radiation portion is disposed between the at least one metal layer and the metal frame, the radiation portion is close and spaced to the metal layer.

13. The wireless communication device according to claim 12, wherein the metal element is one of a middle frame, a metal cable, a metal shielding plate, a printed circuit board, a flexible circuit board, a control chip, a camera module or a retaining wall.

14. The wireless communication device according to claim 11, the antenna structure further comprising an extension portion connected to the radiation portion and the first grounding portion.

15. The wireless communication device according to claim 14, wherein one end of the extension portion connects to the radiation portion, a second end of the extension portion extends for a distance in a direction away from the radiation portion and bends and extends in a direction close to the first grounding portion, and is spaced from the first grounding portion.

16. The wireless communication device according to claim 14, wherein a first end of the extension portion connects to the first grounding portion, a second end of the extension portion extends for a distance in a direction away from the metal frame, and bends and extends in a direction close to the radiation portion, and is spaced from the radiation portion.

17. The wireless communication device according to claim 14, wherein the extension portion and the radiation portion are disposed coplanar.

18. The wireless communication device according to claim 11, wherein the radiation portion comprises a main body and an extension section, a first end of the extension section is connected to a first end of the main body close to the second grounding portion, and a second end of the extension section extends away from the main body.

19. The wireless communication device according to claim 11, further comprising a metal back cover arranged in parallel with the radiation portion.

20. The wireless communication device according to claim 11, further comprising a matching circuit, wherein the feeding source connects to the antenna structure through the matching circuit, the feeding source feeds electrical signals to the antenna structure through the matching circuit; wherein the matching circuit comprises a first capacitor, a second capacitor, a first inductor and a second inductor, a first end of the first capacitor connects to the radiation portion, a second end of the first capacitor connects to a first end of the second capacitor, and a second end of the second capacitor is grounded, a first end of the first inductor connects between the first capacitor and the second capacitor, and a second end is grounded, a first end of the second inductor connects between the first capacitor and the first inductor, and a second end of the second inductor connects to the feeding source.

* * * * *